(12) United States Patent
Kang et al.

(10) Patent No.: US 8,012,902 B2
(45) Date of Patent: Sep. 6, 2011

(54) PARTIALLY DEACTIVATED METAL CATALYSTS AND METHODS FOR PREPARING THE SAME

(75) Inventors: Jeung Ku Kang, Daejeon (KR); Kyung Min Choi, Daejeon (KR); Jung Hoon Choi, Daejeon (KR); Saji Augustine, Daejeon (KR); Weon Ho Shin, Daejeon (KR); Seong Ho Yang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 321 days.

(21) Appl. No.: 12/323,611

(22) Filed: Nov. 26, 2008

(65) Prior Publication Data

US 2010/0022384 A1 Jan. 28, 2010

(30) Foreign Application Priority Data

Jul. 24, 2008 (KR) ........................ 10-2008-0072347

(51) Int. Cl.
  *B01J 27/24* (2006.01)
  *B01J 21/02* (2006.01)
  *B01J 21/00* (2006.01)
  *B01J 23/70* (2006.01)
  *B01J 23/74* (2006.01)
  *H05H 1/00* (2006.01)
  *H05H 1/24* (2006.01)
  *C23C 8/00* (2006.01)
  *C23C 8/26* (2006.01)

(52) U.S. Cl. ........ 502/200; 502/207; 502/258; 502/338; 427/535; 427/569; 427/576; 148/225; 148/230

(58) Field of Classification Search .................. 502/200, 502/207, 258, 338; 427/535, 569, 576; 148/225, 148/230

See application file for complete search history.

(56) References Cited

U.S. PATENT DOCUMENTS

| | | | |
|---|---|---|---|
| 7,115,305 B2 * | 10/2006 | Bronikowski et al. | 427/249.1 |
| 2005/0106098 A1 * | 5/2005 | Tsang et al. | 424/1.11 |
| 2009/0196826 A1 * | 8/2009 | Gao et al. | 424/9.3 |
| 2009/0238996 A1 | 9/2009 | Nakano et al. | |

FOREIGN PATENT DOCUMENTS

WO   WO 2007/139086 A1   12/2007

OTHER PUBLICATIONS

"Density control of single-walled carbon nanotubes using patterned iron nanoparticle catalysts derived from phase-separated thin films of a polyferrocene block copolymer," Sara Lastella et al. J. Mater. Chem., 2004, pp. 1791-1794.*

* cited by examiner

*Primary Examiner* — Patricia L Hailey
(74) *Attorney, Agent, or Firm* — Sterne, Kessler, Goldstein & Fox PLLC

(57) ABSTRACT

Disclosed are partially deactivated metal catalysts useful for modifying structures of nanomaterials. The present invention is also directed to a method for preparing the partially deactivated metal catalysts, which comprises patterning a substrate with micelles containing iron nanoparticles, removing the micelles from the patterned substrate to deposit the iron nanoparticles thereon, nitriding the iron nanoparticles using a nitrogen plasma, and exposing the nitrided iron nanoparticles to a mixture of ethanol and nitric acid to remove iron from the surface of the nitrided nanoparticles. The iron nitride metal catalyst with a nano-size according to the present invention comprises a core that includes deactivated iron nitride and an active shell surrounding the core. Thus, when preparing a carbon nanotube, the metal catalyst can be effectively used to control the number of walls formed in the carbon nanotube.

16 Claims, 3 Drawing Sheets

US 8,012,902 B2

PARTIALLY DEACTIVATED METAL CATALYSTS AND METHODS FOR PREPARING THE SAME

CROSS-REFERENCE TO RELATED APPLICATION

This application claims priority to Korean Patent Application No. 10-2008-0072347, filed on 24 Jul. 2008 in the Korean Intellectual Property Office, the disclosure of which is incorporated herein by reference in its entirety.

BACKGROUND OF THE INVENTION

1. Field of the Invention

The present invention relates to partially deactivated metal catalysts useful for modifying structures of nanomaterials (e.g., nanotubes) and a method for preparing the same.

2. Description of the Related Art

Metal particles with nano size which are well known to specific electrical, optical and magnetic properties distinguishable from those of bulk nanoparticles, are recently growing interest in a variety of applications. Owing to composition of components having different nano size, metal nanoparticles show partially different chemical activities, therefore, can be used in combination with modern science and technologies in many different fields. Such metal nanoparticles can be used as catalysts for preparation of nanomaterials. Under this circumstance, a great deal of research and investigations about metal nanoparticles are presently underway all over the world.

The metal nanoparticles used in preparing nanomaterials are closely associated with structures and characteristics of the resultant nanomaterials. Accordingly, in order to obtain the prepared nanomaterial having a desired structure and characteristics, an research for controlling the structure and characteristics of a metal catalyst is necessary. At present, there is difficulty in preparation of nanoparticle catalyst having desired structures and/or characteristics and there has been little progress on investigations into development thereof. Application of recent techniques such as electron beam lithography, micro contact printing, shadow masking, etc. can somewhat control an alignment of nanoparticles and/or sizes of catalyst nanoparticles, however, these techniques require high cost leading to an obstacle in preparing commercially available products and have a problem of being only used for very small substrates.

Another conventional method using block copolymer micelles to prepare a metal catalyst having a controlled uniform size, in which nanoparticles are aligned in a wide area at a uniform interval, has been proposed. However, there has been little attempt to control the structure or chemical activity of each catalyst particle with nano-size.

SUMMARY OF THE INVENTION

Accordingly, there is a need for developing of a partially deactivated metal catalyst with nano size to prepare nanomaterials having desired structure and characteristics. As such, the present invention relates to a partially deactivated metal catalyst with nano size and a method for preparing the same. More particularly, the present invention provides a metal catalyst with nano size consisting of exposed deactivated core and active shell surrounding the core, and a method for preparing the same, thereby being favorably applied in preparation of a nanomaterial having desired characteristics and structure.

The present inventors have undertaken extensive research and studies to develop a variety of nanomaterials such as carbon nanotubes and found that characteristics and structure of a nanomaterial are closely associated with characteristics and structure of a material used for a catalyst and, in order to obtain the nanomaterial having desired characteristics and structure, the structure of the catalyst must be controlled, resulting in completion of the present invention.

Accordingly, in order to solve the above problems in regard to conventional techniques and an object of the present invention is to provide a metal catalyst with nano size, consisting of exposed deactivated core and active shell surrounding the core, thereby being favorably applied in preparation of a nanomaterial having desired characteristics and structure.

Another object of the present invention is to provide a simple and economically advantageous method for preparation of catalyst with nano size capable of treating partially deactivated metal nanoparticles in large amounts and low cost.

A still further object of the present invention is to provide a nanomaterial having desired structure using the prepared metal catalyst described above.

The partially deactivated metal catalyst with nano size according to the present invention can be applicable in preparing a variety of nanomaterials. Regulating a size and a structure of the metal catalyst, results in a controlled structure of a resultant nanomaterial such as a carbon nanotube having controlled number of walls.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2A is an image obtained using a SEM showing the partially deactivated catalysts; FIG. 2B is an image of a topographic mode obtained using an AFM showing the same catalyst; FIG. 2C is an image of a phase mode obtained using an AFM showing the same catalyst; and FIG. 2D is an image obtained using a TEM showing the same catalyst; FIG. 3A is an image of a cross section obtained using the SEM showing of carbon nanotube grown from the partially deactivated catalyst; FIG. 3B is an image of a plane section obtained using the SEM showing of the same carbon nanotube; FIG. 3C is an image obtained using the TEM showing the same carbon nanotube; and FIG. 3D is an enlarged image of FIG. 3C.

Figures 1A, 1B, 1C, 1D, 1E:
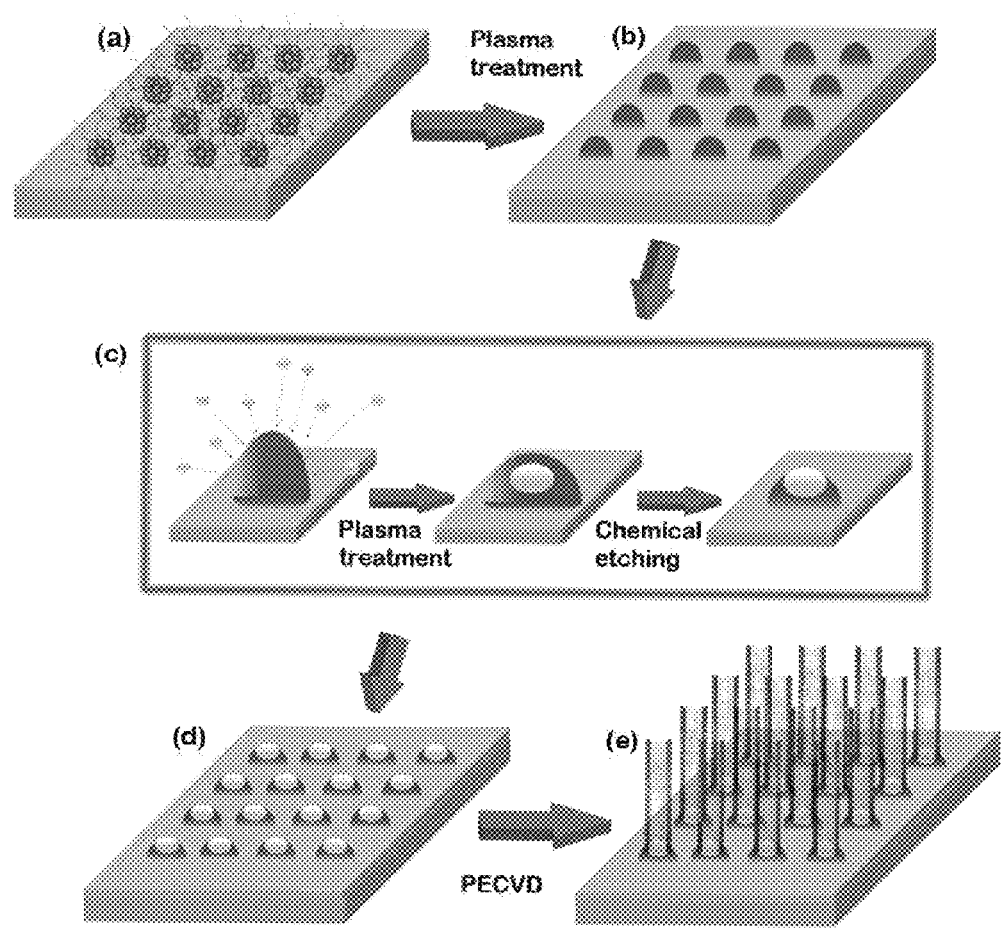
FIGS. 1A-1E provide a schematic diagram illustrating a process for preparing a metal catalyst of the present invention.

Reference will now be made in detail to the embodiments of the present invention, examples of which are illustrated in the accompanying drawings.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

References to spatial descriptions (e.g., "above," "below," "up," "down," "top," "bottom," etc.) made herein are for purposes of description and illustration only, and should be interpreted as non-limiting upon the methods of the present invention, and catalysts prepared therefrom, and any products prepared using the catalysts, which can be spatially arranged in any orientation or manner.

The present invention provides a method for preparing a partially deactivated metal catalyst.

The method of the present invention comprises patterning a substrate using micelles containing iron nanoparticles. Substrates suitable for use with the present invention include, but are not limited to silicon (e.g., crystalline silicon, amorphous silicon, polycrystalline silicon, and the like), ceramics (e.g., nitrides, carbides, oxides, silicides, borides, and combinations thereof), glasses, and other substrates known to persons of ordinary skill in the art. In some embodiments, a micelle is a block co-polymer micelle.

The method of the present invention further comprises removing the micelles from the patterned substrate to form iron nanoparticles thereon. In some embodiments, the micelles are removed using a plasma (i.e., to degrade the micelles). For example, in some embodiments the micelles are removed, thereby depositing the iron nanoparticles on a substrate by exposing the micelles to a plasma (e.g., a hydrogen plasma or a nitrogen plasma).

The method of the present invention further comprises nitrogen plasma treating the formed iron nanoparticles to form iron nitride inside the iron nanoparticles; and exposing the nitrided nanoparticles to a mixture of ethanol and nitric acid to remove iron moiety existing outside the iron nanoparticles (i.e., iron present on the surface of the nanoparticles), thereby exposing the iron nitride present within the core of the nanoparticles.

In order to nitride the iron nanoparticles, the iron nanoparticles can be treated with a nitrogen plasma. In this case, the nitrogen plasma is performed using nitrogen gas of about 80 sccm to about 100 sccm at a plasma power of about 500 W to about 800 W, about 550 W to about 750 W, or about 600 W to about 700 W, and at a temperature of 600° C. to about 900° C., about 650° C. to about 850° C., or about 700° C. to about 800° C.

After nitriding the nanoparticles, the nitrided nanoparticles are exposed to a mixture of nitric acid and ethanol in a ratio by volume of 1:5, which removes iron from the surface of the nitrided nanoparticles, thereby exposing an outer surface of the nitrided iron nanoparticle. In some embodiments, the exposing is performed for about 1 hour to about 2 hours.

The present invention also provides a partially deactivated catalyst prepared by the method described above.

As for the partially deactivated catalyst, the preparation method of the present invention comprises a process of forming iron nanoparticles from the micelles on a substrate, a process of nitriding the iron nanoparticles to form iron nitride inside the iron nanoparticles and a process of etching the substrate with an ethanol/nitric acid solution. As a result, the metal catalyst is prepared, which consists of iron and exposed core containing iron nitride. The prepared metal catalyst can be used to prepare a carbon nanotube having controlled walls, based on a difference in chemical activities between iron and the iron nitride formed at the center portion.

Next, the present invention will be described in detail with reference to the following examples. However, it should be noted that these are given as illustrative embodiments of the present invention and the scope of the invention is not limited thereto.

EXAMPLE 1A

Preparation of Partially Deactivated Iron Catalyst

First, a surface of a silicon substrate was coated with block copolymer (PS-P4VP) micelles containing iron nanoparticles using a spin coater at 2,000 to 3,000 rpm for 1 minute, followed by nitrogen plasma treating at 100° C. for 1 minute to remove the micelles and form the iron nanoparticles with a uniform size aligned at a uniform interval. Next, the iron nanoparticles were treated with nitrogen gas of 120 sccm at 800° C. for 1 minute. In this process, nitrogen radicals reacted with iron nanoparticles and diffusion occurred inside the iron nanoparticles so as to form iron nitride inside the iron nanoparticles. Following this, the resultant nitrided iron nanoparticles were exposed to a mixture of nitric acid and ethanol in a ratio by volume of about 1:5 for 2 hours. The nitric acid and ethanol solution selectively etched iron from the surface of the nitrided nanoparticles, thereby removing iron moiety existing on the surface of the nitrided iron nanoparticles, and thereby exposing the iron nitride present within the cores of the nitrided iron nanoparticles. As a result, partially deactivated iron catalysts were prepared. The prepared iron catalyst exhibited controlled chemical activity, in which the iron nitride formed inside the nanoparticles was substantially exposed to the outside.

EXAMPLE 1B

Alternative Preparation of Partially Deactivated Iron Catalyst

Alternatively, the partially deactivated catalyst can be prepared using hydrogen gas. In this case, the iron nanoparticles are treated with hydrogen gas of about 100 sccm at 800° C. for 90 seconds, followed by the subsequent process the same as described above in Example 1A, so as to remove iron from the surface of the nitrided iron nanoparticles, and expose the iron nitride to the outside.

EXAMPLE 2

Characterization of the Partially Deactivated Iron Catalyst

FIGS. 1A-1E provide a schematic diagram illustrating a process for preparation of a metal catalyst according to the present invention. FIG. 1A provides a graphic representation of block copolymer micelles surrounding iron nanoparticles aligned on a substrate, wherein the iron nanoparticles in center portion have round shapes and the block copolymer micelles surround the iron nanoparticles. FIG. 1B shows iron catalyst with a uniform size aligned at a uniform interval on the substrate, wherein black parts represent the iron nanoparticles. FIG. 1C shows a series of process to form iron nitride inside the iron nanoparticles and expose the prepared iron nitride to the outside via plasma treatment and chemical treatment, wherein the iron nitride is shown in a round shape at the center of the iron nanoparticles. FIG. 1D shows an alignment of the iron catalyst with the exposed iron nitride. Lastly, FIG. 1E shows a carbon nanotube grown using the prepared catalyst.

Figures 2A, 2B, 2C, 2D:
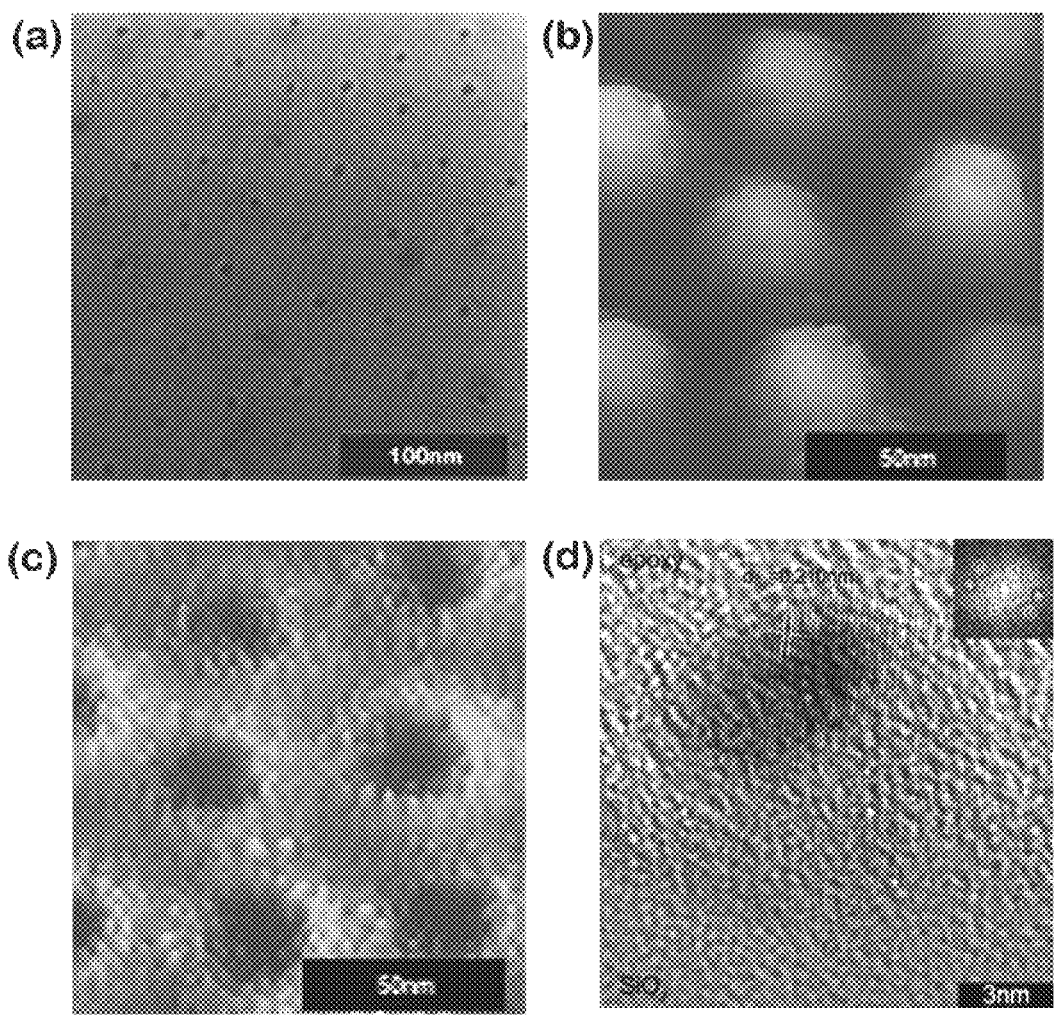
FIGS. 2A-2D provide images obtained using a scanning electron microscope (SEM), an atomic force microscope (AFM) and a transmission electron microscope (TEM), each image illustrating a partially deactivated metal catalyst in a hemispheric shape consist of a different kind of metal compound in a center portion of the catalyst, in particular.

FIG. 2 shows images obtained using a scanning electron microscope (SEM), an atomic force microscope (AFM) and a transmission electron microscope (TEM) and analysis results thereof, which each shows a partially deactivated catalyst prepared via forming iron nitride and exposing the formed iron nitride to the outside. In particular, FIG. 2A is an image obtained using the SEM showing the partially deactivated catalyst; FIG. 2B is an image of a topographic mode obtained using the AFM showing the same catalyst; FIG. 2C is an image of the a phase mode obtained using the AFM showing the same catalyst; and FIG. 2D is an image obtained using the TEM showing the same catalyst. From the images obtained using the SEM and the TEM, the black parts indicate the iron nitride while the bright grey parts represent iron moiety. Additionally, the images of the topographic mode and the phase mode obtained using the AFM show that the catalysts are in a hemispherical shape and a shell surrounding the core part distinguished from the core part.

EXAMPLE 3

Growth of Carbon Nanotubes Using the Prepared Iron Catalyst

Using the iron catalysts prepared as described above, carbon nanotubes were prepared. The carbon nanotubes were substantially prepared via plasma chemical vapor deposition and grown using hydrogen gas of 85 sccm and methane gas of 15 sccm at a pressure of 23 Torr and a plasma power of 800 W for 20 minutes.

Figures 3A, 3B, 3C, 3D:
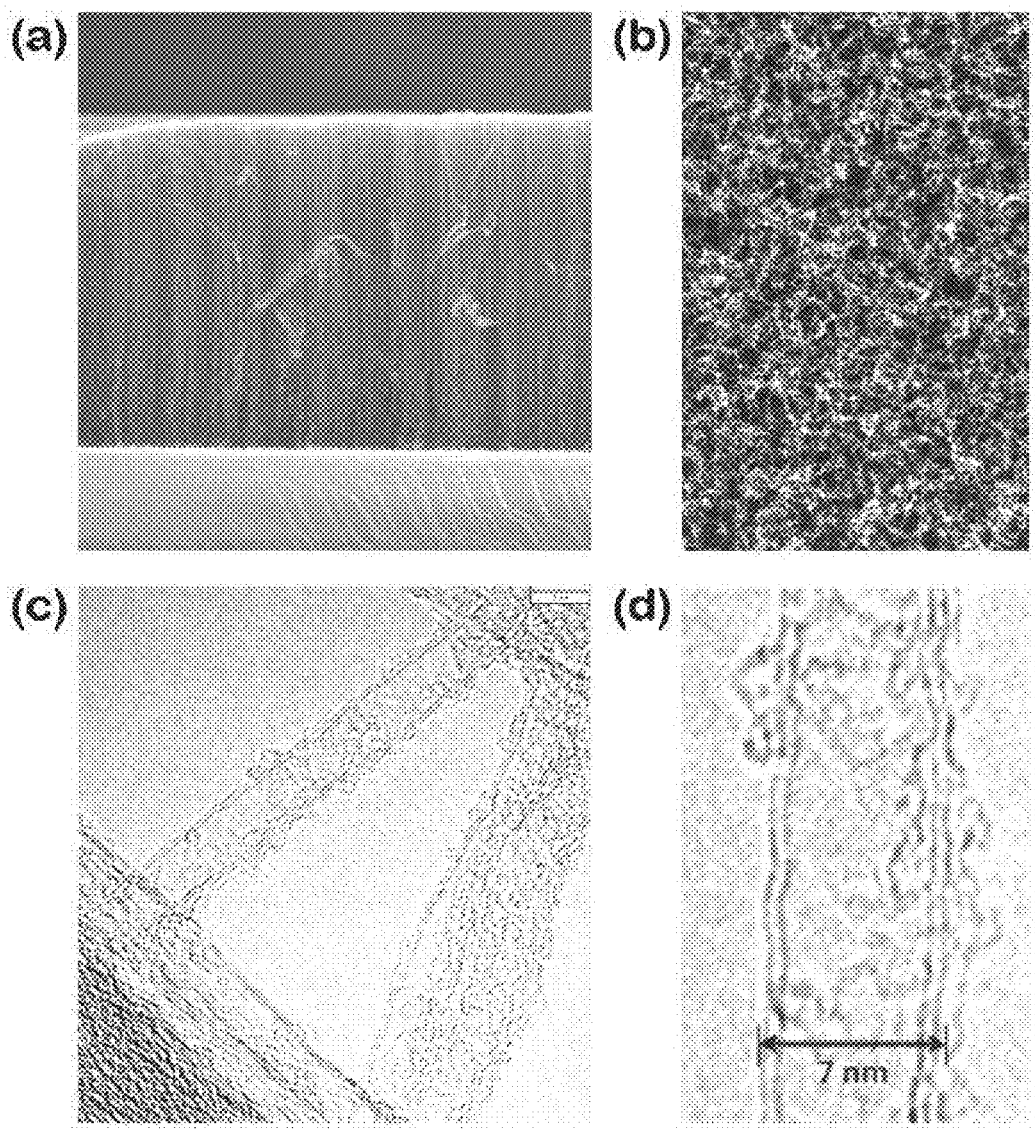
FIGS. 3A-3D provide images obtained using a SEM and a TEM, which each show carbon nanotubes prepared using a partially deactivated catalyst. In particular.

FIGS. 3A-3D provide images obtained using a scanning electron microscope (SEM) and a transmission electron microscope (TEM), which each shows carbon nanotube prepared using a partially deactivated catalyst. In particular, FIG. 3A is an image of a cross section obtained using the SEM showing of carbon nanotube grown from the partially deactivated catalyst; FIG. 3B is an image of a plane section obtained using the SEM showing of the same carbon nanotube; FIG. 3C is an image obtained using the TEM showing the same carbon nanotube; and FIG. 2D is an enlarged image of FIG. 3C. The image obtained using the SEM shows the carbon nanotubes grown using the prepared catalyst and the image obtained using the TEM is an enlarged image showing structure of the carbon nanotubes. From the image obtained using the TEM, it was observed that each nanotube has an inner diameter ranging of about 7 nm to about 8 nm. This result was substantially identical to a size of a conventional carbon nanotube that was grown using a general catalyst having the same size as that of the iron catalyst according to the present invention. It was identified that all of the carbon nanotubes grown using the catalyst of the present invention have a uniform thickness and include 2 or 3 walls in each nanotube.

As is apparent from the above, the partially deactivated metal catalyst with nano size prepared according to the present invention, can control size and structure of nanomaterials and the number of walls of the nanomaterial and, in addition, is capable of being used for preparing nanomaterials such as carbon nanotubes with desired structure. So the present invention can be used on an industrial scale.

Although several embodiments of the present invention have been shown and described, it would be appreciated by those skilled in the art that changes can be made in these embodiments without departing from the principles and spirit of the invention, the scope of which is defined in the claims and their equivalents.

CONCLUSION

These examples illustrate possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method for preparing a partially deactivated metal catalyst, the method comprising:
   patterning a substrate with micelles containing iron nanoparticles, to provide a patterned substrate;
   removing the micelles from the patterned substrate to form a pattern of iron nanoparticles on the substrate;
   nitrogen plasma treating the iron nanoparticles to provide nitrided iron nanoparticles; and
   exposing the nitrided iron nanoparticles to a mixture of ethanol and nitric acid to remove iron from the surface of the nitrided iron nanoparticles, and thereby exposing iron nitride present within cores of the nitrided iron nanoparticles.

2. The method according to claim 1, wherein the substrate comprises silicon.

3. A partially deactivated metal catalyst prepared by the method of claim 2.

4. The method according to claim 1, wherein the micelles comprise block co-polymer micelles.

5. A partially deactivated metal catalyst prepared by the method of claim 4.

6. The method according to claim 1, wherein the removing the micelles is performed using a nitrogen plasma at about 100° C. for about 1 minute.

7. A partially deactivated metal catalyst prepared by the method of claim 6.

8. The method according to claim 1, wherein the removing the micelles is performed using hydrogen gas of about 80 sccm to about 100 sccm at a plasma power of about 500 W to about 800 W and at a temperature of about 600° C. to about 900° C.

9. A partially deactivated metal catalyst prepared by the method of claim 8.

10. The method according to claim 1, wherein the nitrogen plasma treating is performed using nitrogen gas of about 80 sccm to about 100 sccm at a plasma power of about 500 W to about 800 W and at a temperature of about 600° C. to about 900° C.

11. A partially deactivated metal catalyst prepared by the method of claim 10.

12. The method according to claim 1, wherein the nitrided iron nanoparticles comprise an iron nitride localized within the interior of nanoparticles.

13. A partially deactivated metal catalyst prepared by the method of claim 12.

14. The method according to according to claim 1, wherein the exposing is performed by exposing the iron nanoparticles to a mixture of nitric acid and ethanol in a ratio by volume of about 1:5 for about 1 hour to about 2 hours.

15. A partially deactivated metal catalyst prepared by the method of claim 14.

16. A partially deactivated metal catalyst prepared by the method of claim 1.

* * * * *